United States Patent
Mazzucco et al.

(10) Patent No.: US 11,098,143 B2
(45) Date of Patent: Aug. 24, 2021

(54) PROCESS FOR GAS-PHASE POLYMERIZATION OF OLEFINS

(71) Applicant: BASELL POLIOLEFINE ITALIA S.R.L., Milan (IT)

(72) Inventors: Antonio Mazzucco, Ferrara (IT); Enrico Balestra, Ferrara (IT); Roberto Pantaleoni, Ferrara (IT); Davide Tartari, Ferrara (IT); Riccardo Rinaldi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/649,044

(22) PCT Filed: Sep. 13, 2018

(86) PCT No.: PCT/EP2018/074705
§ 371 (c)(1),
(2) Date: Mar. 19, 2020

(87) PCT Pub. No.: WO2019/057595
PCT Pub. Date: Mar. 28, 2019

(65) Prior Publication Data
US 2020/0216588 A1 Jul. 9, 2020

(30) Foreign Application Priority Data

Sep. 21, 2017 (EP) ..................................... 17192309

(51) Int. Cl.
*B01J 8/26* (2006.01)
*C08F 210/06* (2006.01)
*B01J 8/22* (2006.01)

(52) U.S. Cl.
CPC ............. *C08F 210/06* (2013.01); *B01J 8/228* (2013.01); *B01J 8/26* (2013.01);
(Continued)

(58) Field of Classification Search
CPC ...... C08F 2/001; C08F 4/6543; C08F 4/6492; C08F 110/06; C08F 210/06;
(Continued)

(56) References Cited

U.S. PATENT DOCUMENTS

2006/0046927 A1  3/2006 Klendworth et al.
2009/0149610 A1  6/2009 Sato et al.
(Continued)

FOREIGN PATENT DOCUMENTS

EP  782587 A1  7/1997
EP  1012195 A1  6/2000
(Continued)

OTHER PUBLICATIONS

Monomer Sequence Distribution in Ethylene-Propylene Rubber Measured by 13C NMR. 3. Use of Reaction Probability Mode C. J. Carman, R. A. Harrington and C. E. Wilkes, Macromolecules, 1977, 10, 536.
(Continued)

*Primary Examiner* — William K Cheung

(57) ABSTRACT

A process for the polymerization of olefins in gas phase carried out in a reactor having two interconnected polymerization zones, a first zone (riser) and a second zone (downcomer), wherein growing polymer particles:
a) flow through the riser under fast fluidization conditions established by feeding a mixture of gas and liquid;
b) leave the riser and enter the downcomer, through which the growing polymer particles flow downward in a densified form; and
c) leave the downcomer and are reintroduced into the riser, thereby establishing a circulation of polymer between the riser and the downcomer;
the reactor is operated at a temperature between 0° C. and 5° C. above the dew point of the riser gas at the operating pressure, and
(Continued)

in the riser, besides the growing polymer particles and gas flow, an amount of liquid is present.

12 Claims, 1 Drawing Sheet

(52) U.S. Cl.
CPC ............... *B01J 2208/00734* (2013.01); *B01J 2208/00991* (2013.01); *C08F 2410/02* (2013.01)

(58) Field of Classification Search
CPC .......... C08F 2410/02; B01J 8/228; B01J 8/26; B01J 2208/00734; B01J 2208/00991
USPC .......................................................... 526/64
See application file for complete search history.

(56) References Cited

U.S. PATENT DOCUMENTS

| 2011/0152424 | A1 | 6/2011 | Cai et al. |
| 2011/0184131 | A1* | 7/2011 | Cai ..................... B01J 8/1863 526/64 |

FOREIGN PATENT DOCUMENTS

| EP | 1720913 | A1 | 11/2006 |
| EP | 2281010 | A1 | 2/2011 |
| JP | 2010528136 | A | 8/2010 |
| KR | 20070029113 | A | 3/2007 |
| KR | 20170053646 | A | 5/2017 |
| WO | 2006067052 | A1 | 6/2006 |
| WO | 2008141934 | A1 | 11/2008 |
| WO | 2011029735 | A1 | 3/2011 |
| WO | 2012031986 | A1 | 3/2012 |
| WO | 2018177701 | A1 | 10/2018 |

OTHER PUBLICATIONS

Carbon-13 NMR determination of monomer sequence distribution in ethylene-propylene copolymers prepared with ?-titanium trichloride-diethylaluminum chloride M. Kakugo, Y. Naito, K. Mizunuma and T. Miyatake, Macromolecules, 1982, 15, 1150.

International Search Report and Written Opinion dated Jan. 3, 2019 for Corresponding PCT/EP2018/074705.

* cited by examiner

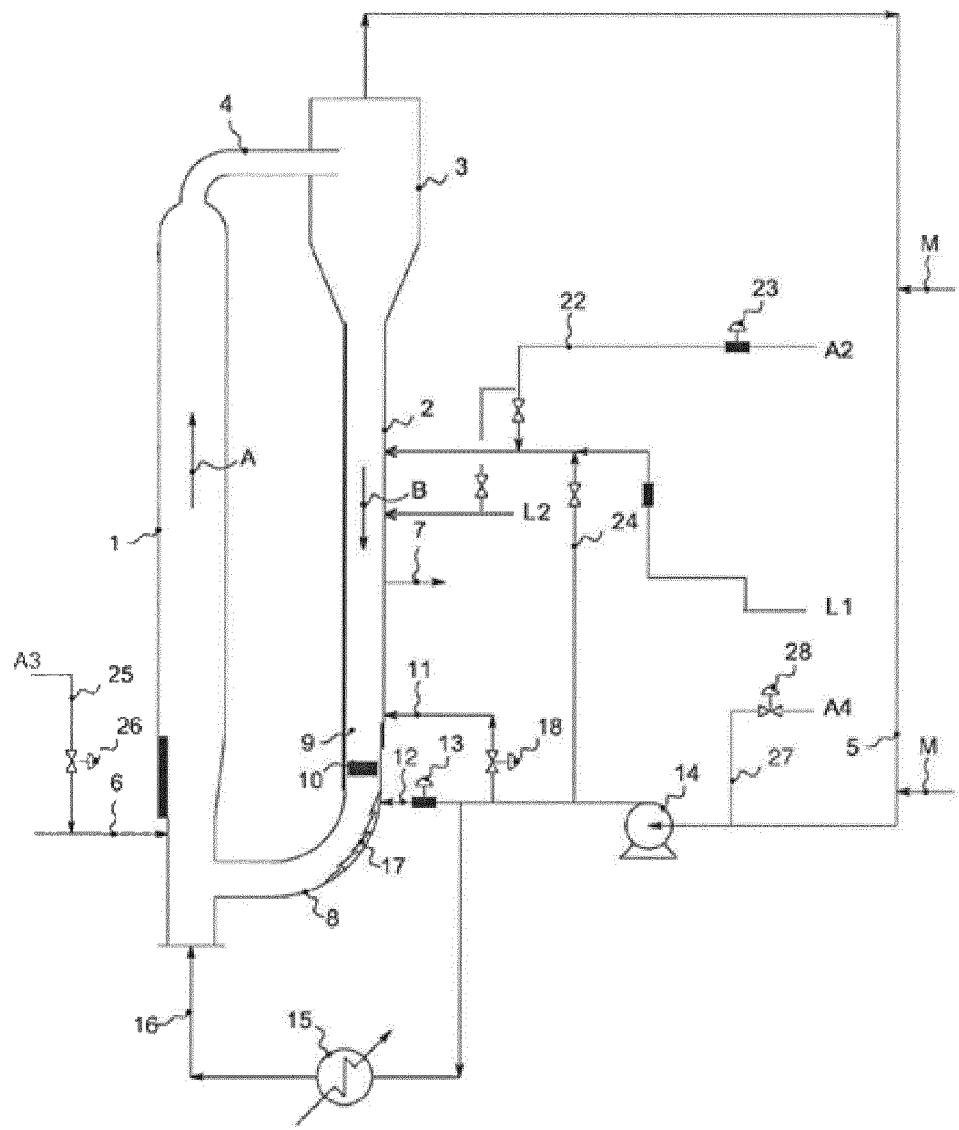

PROCESS FOR GAS-PHASE POLYMERIZATION OF OLEFINS

This application is the U.S. National Phase of PCT International Application PCT/EP2018/074705, filed Sep. 13, 2018, claiming benefit of priority to European Patent Application No. 17192309.7, filed Sep. 21, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a gas-phase process for the polymerization of olefins, carried out in a reactor having two interconnected polymerization zones.

BACKGROUND OF THE INVENTION

The development of Ziegler-Natta olefin polymerization catalysts has led to the use on an industrial scale of processes wherein the polymerization of olefins is carried out in a gaseous medium in the presence of a solid catalyst.

A technology for gas-phase polymerization processes is fluidized bed technology. In fluidized bed gas-phase processes, the polymer is confined in a vertical cylindrical zone, the polymer bed. In some instances, the reaction gases exiting the reactor are taken up by a compressor, cooled and sent back, together with make-up monomers and hydrogen, to the bottom of the polymer bed through a distribution plate. Entrainment of solids from the gas exiting the reactor is limited by the design of the upper part of the reactor termed the "freeboard" (that is, the space between the upper bed surface and the gas exit point) and, in some designs, by the interposition of cyclones in the gases exit line. The flow rate of the circulating gaseous monomers is set to assure a velocity within an adequate range above the minimum fluidization velocity and below the "transport velocity". In some instances, the heat of reaction is removed by cooling the circulating gas. The composition of the gas-phase controls the composition of the polymer while the addition of inert gases controls the reaction kinetics.

Because fluidized bed reactors approximate the ideal behavior of a "continuous stirred-tank reactor" (CSTR), it is difficult to obtain a homogeneous mixture of different types of polymeric chains. The composition of the gaseous mixture that is in contact with the growing polymer particle is uniform for the residence time of the particle in the reactor.

Multizone circulating reactor (MZCR) represents a gas-phase technology alternative to the fluidized bed reactor technology. This polymerization process is carried out in a gas-phase reactor having two interconnected polymerization zones. The polymer particles flow upwards through a first polymerization zone, denominated "riser", under fast fluidization or transport conditions, leave the riser and enter a second polymerization zone, denominated "downcomer", through which the polymer particles flow in a densified form under the action of gravity. A continuous circulation of polymer is established between the riser and the downcomer.

In some instances, two polymerization zones with different composition are obtained by feeding a gas/liquid stream, denominated "barrier stream", to the upper part of the downcomer. In some instances, the gas/liquid stream acts as a barrier to the gas phase coming from the riser and establishes a net gas flow upward in the upper portion of the downcomer. The established flow of gas upward has the effect of preventing the gas mixture present in the riser from entering the downcomer.

In a single reactor, the MZCR polymerization process can yield broad molecular weight olefin polymers, including multimodal olefin polymers. As used herein, the term "multimodal" refers to the modality of the molecular weight distribution and includes bimodal. Alternatively, the polymers can be obtained from polymerizing olefins in a cascade of two or more polymerization reactors. The "modality" indicates how many different polymerization conditions were utilized to prepare the polyolefin, independently of whether this modality of the molecular weight distribution can be recognized as separated maxima in a gel permeation chromatography (GPC) curve or not. In addition to the molecular weight distribution, the olefin polymer can also have a comonomer distribution.

In some instances, quick evaporation of the liquid inside the downcomer generates an upward flow of vapor, thereby locally fluidizing the polymer particles and interrupting the regular plug flow of the polymer along the downcomer. These local fluidization conditions cause the residence time of the particles to become non-homogeneous inside the downcomer.

The operation stability and the production rate of a MZCR are affected by a variety of factors such as the temperature profile along the downcomer. The temperature profile is linked to the reactor temperature at the riser outlet, which is controlled via heat removal and defines the temperature of the upper part of the downcomer. The downcomer bottom temperature depends on the production rate and the solid circulation. High temperatures in the downcomer can cause fouling, sheeting and the blockage of the discharge valve(s), thereby resulting in a shut down. The maximum acceptable temperature depends on the characteristics of the individual grades. In some instances, the riser temperature is kept at least 5° C. higher than the dew point of the reactor gas mixture at the MZCR operating pressure. At these conditions, the riser operates in dry mode. The polymer particles are transferred from the bottom of the riser to the downcomer by a gas flow with no presence of condensate.

SUMMARY OF THE INVENTION

In a general embodiment, the present disclosure provides a process for the polymerization of olefins in gas phase carried out in a reactor having two interconnected polymerization zones, a first zone named the "riser" and a second zone named the "downcomer", wherein growing polymer particles:

(a) flow through the riser under fast fluidization conditions established by feeding a mixture of gas and liquid;
(b) leave the riser and enter the downcomer, through which the growing polymer particles flow downward in a densified form; and
(c) leave the downcomer and are reintroduced into the riser, thereby establishing a circulation of polymer between the riser and the downcomer;

the reactor is operated at a temperature between 0° C. and 5° C. above the dew point of the riser gas at the operating pressure; and
in the riser, besides the growing polymer particles and gas flow, an amount of liquid is present.

BRIEF DESCRIPTION OF THE DRAWING

The FIGURE depicts schematically a gas-phase MZCR having two interconnected polymerization zones.

DETAILED DESCRIPTION OF THE INVENTION

In some embodiments, a MZCR is operated at a pressure and a temperature such that an amount of liquid is present in the whole riser or in a significant portion of the riser. In some embodiments and used herein, a "significant portion" is defined as having an amount of liquid present from the bottom to a certain height of the riser up to 75% of the height, alternatively up to 50% of the height. No liquid is present respectively above 75% or 50% of the height of the riser. In some embodiments wherein an amount of liquid is present in the whole riser, an amount of liquid is present in the upper part of the downcomer.

In some embodiments, the pressure of operation of the MZCR is between 5 and 40 bar-g, alternatively between 10 and 35 bar-g, alternatively between 20 and 30 bar-g.

In some embodiments, the temperature of operation of the MZCR is between 40 and 120° C., alternatively between 45 and 100° C., alternatively between 50 and 85° C., alternatively between 55 and 70° C.

In some embodiments, the difference between the temperature of operation of the reactor and the dew point of the gas in the reactor is between 0.5° C. and 4° C., alternatively between 1° C. and 3° C.

In some embodiments and in the first polymerization zone (riser), fast fluidization conditions are established by feeding a mixture of gas and liquid made from or containing one or more alpha-olefins at a velocity higher than the transport velocity of the polymer particles. In some embodiments, the gas velocity within the riser is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In some embodiments and in the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In some embodiments and in the downcomer, the polymer flows downward in a plug flow and small quantities of gas are entrained with the polymer particles.

In some embodiments, the two interconnected polymerization zones are operated such that the fluid mixture coming from the riser is totally or partially prevented from entering the downcomer by introducing into the upper part of the downcomer a liquid or gas stream, denominated the "barrier stream", having a composition different from the fluid mixture present in the riser. In some embodiments, the barrier stream is achieved by placing one or more feeding lines for the barrier stream in the downcomer close to the upper limit of the volume occupied by the polymer particles flowing downward in a densified form.

In some embodiment, this liquid/gas mixture fed into the upper part of the downcomer partially replaces the fluid mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the fluid mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the resulting polymeric chains. In some embodiments, hydrogen is used to regulate the molecular weight. In some embodiments, the polymerization diluents are selected from $C_2$-$C_8$ alkanes, alternatively selected from the group consisting of propane, isobutane, isopentane and hexane. In some embodiments, propane is used as the polymerization diluent in the gas-phase polymerization. In some embodiments, the barrier stream is made from or containing propane.

In some embodiments, the barrier stream is made from or contains:
  i. from 10 to 100% by mol of propylene, based upon the total moles in the barrier stream;
  ii. from 0 to 80% by mol of ethylene, based upon the total moles in the barrier stream;
  iii. from 0 to 30% by mol of propane, based upon the total moles in the barrier stream; and
  iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from the condensation or distillation of part of a gaseous stream continuously recycled via a gas recycle line to the reactor having two interconnected polymerization zones.

In some embodiments, additional liquid or gas of the composition is fed along the downcomer at a point below the barrier stream.

In some embodiments, the recycle gas stream is withdrawn from a gas/solid separator placed downstream of the riser, cooled by passage through an external heat exchanger and then recycled to the bottom of the riser. In some embodiments, the recycle gas stream is made from or contains the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer.

In some instances, condensate is present at the cooler gas discharge. It is believed that removal of reaction heat causes part of the recirculation gas to condense. This condensate is completely vaporized when the condensate enters the riser bottom and is contacted with the hot recirculating solid flow from the downcomer bottom. It is believed that presently-disclosed process does not cause complete vaporization of the condensate because the riser temperature is close to the dew point of the condensate. After the gas flow is contacted with the hot recirculating solid flow, some condensate remains unvaporized and is entrained in the upper part of the riser in a three-phase flow regime.

In some embodiments, a controlled decrease of the MZCR operating temperature up to values at or close to the condensation point of the riser gas does not negatively affect the reactor operation both in the riser and in the downcomer. The controlled decrease of the MZCR operating temperature provides a controlled amount of condensate at the riser bottom. Moreover, a lower temperature profile in the downcomer is obtained, thereby improving polymer flowability and increasing solid recirculation. The increased solid recirculation further reduces the temperature profile. In some embodiments, the condensate in the reactor is dispersed on the polymer particles and acts as an antistatic. In some embodiments, the maximum allowable operating temperature at the bottom of the downcomer depends on the product structure. In some embodiments, the solid recirculation defines the maximum allowable production rate for the MZCR. In some embodiments, a higher temperature difference between the riser and the downcomer bottom temperature yields a higher throughput. In some embodiments and in view of the maximum operating temperature, decreasing the riser (control) temperature of the reactor relative to the dew point facilitates higher production rates.

In an embodiment depicted in The FIGURE, the polymerization reactor includes a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B.

The upper portion of the riser 1 is connected to a solid/gas separator 3 by the interconnection section 4. The separator 3 removes the major part of the unreacted monomers from the polymer particles and the polymer withdrawn from the bottom of separator 3 enters the top portion of the downcomer 2. The separated unreacted monomers, optionally together with polymerization diluents, such as propane, flow up to the top of separator 3 and are successively recycled to the bottom of the riser 1 via the recycle line 5.

A mixture made from or containing one or more olefin monomers, hydrogen as the molecular weight regulator and propane as the polymerization diluent, is fed to the polymerization reactor via one or more lines M, which are placed along the gas recycle line 5.

The catalyst components, optionally after a prepolymerization step, are continuously introduced into the riser 1 via line 6. In some embodiments, the produced polymer is discharged from the reactor via line 7, which is placed on the lower portion of the downcomer 2 and, due to the packed flow of densified polymer, the quantity of gas entrained with the discharged polymer is minimized. In some embodiments and by inserting a control valve (not shown) on the polymer discharge line 7, the flow rate of polymer produced by the polymerization reactor is controlled continuously. In some embodiments, additional polymer discharge lines are placed in the bottom part of the downcomer (not shown).

The polymerization reactor further includes a transport section 8 connecting the bottom of downcomer 2 with the lower region of the riser 1. The bottom of the downcomer 2 converges into a restriction 9. In some embodiments, a control valve 10 with an adjustable opening is placed within the restriction 9. The flow rate (Fp) of polymer continuously circulated between the downcomer 2 and the riser 1 is adjusted by the level of opening of the control valve 10. In some embodiments, the control valve 10 is a mechanical valve. In some embodiments, the mechanical valve is selected from the group consisting of a butterfly valve and a ball valve. A stream of dosing gas is fed into the lower part of the downcomer 2 by line 11 placed at a short distance above the restriction 9. In some embodiments, the dosing gas to be introduced through line 10 is taken from the recycle line 5. In some embodiments, the Fp of polymer particles circulated between downcomer 2 and riser 1 is adjusted by varying the opening of the control valve 10 at the bottom of the downcomer or the flow rate of the dosing gas entering the downcomer via line 11. The flow rate of dosing gas is adjusted by a control valve 18, which is arranged on line 11.

The transport section 8 is designed as a bend descending from the bottom of downcomer 2 up to the lower region of the riser 1. Furthermore, a carrier gas is introduced via line 12 at the inlet of the transport section 8. The flow rate of carrier gas is adjusted by a control valve 13, which is arranged on line 12.

In some embodiments, the carrier gas is taken from the gas recycle line 5. In some embodiments, the gas recycle stream of line 5 is first subjected to compression by compressor 14 and a minor percentage of the recycle stream passes through line 12, thereby entering the transport section 8 and diluting the solid phase of polymer flowing through the transport section 8. The major part of the recycle stream, downstream of the compressor 14, is subjected to cooling in a heat exchanger 15 and successively introduced via line 16 at the bottom of the riser 1 at a high velocity, thereby ensuring fast fluidization conditions in the polymer bed flowing along the riser 1.

The carrier gas merges with the densified polymer coming from downcomer 2 at the inlet portion of transport section 8, after exiting the slits of the gas distribution grid 17. The top end of the distribution grid 17 is coincident with the inlet of the transport section 8, and the distribution grid 17 extends along the bending of the transport section 8 for an angle α=60°. The gas distribution grid 17 is formed by a plurality of trays fixed to the transport section 8 to form slits in the overlapping area of adjacent trays. The gas distribution grid 17 is as described in Patent Cooperation Treaty Publication No. WO 2012/031986.

Hydrogen and the comonomer(s) ethylene or a $C_4$-$C_{10}$ alpha-olefin are pre-dispersed either in the liquid monomer L1 or L2 or, alternatively, in a fraction of recycle gas taken from recycle line 5 via line 24, and then fed to the reactor (flow rate A2, line 22 metered by one or more valves 23).

In some embodiments and as described in Patent Cooperation Treaty Publication No. WO 2011/029735, antistatic compositions are fed into the reactor at the bottom of the riser (flow rate A3, line 25 metered by valve 26) or into the main gas recycle line 5 (flow rate A4, line 27 metered by valve 28).

In some embodiments, the polymerization reactor is operated by adjusting the polymerization conditions and the concentration of monomers and hydrogen in the riser and in the downcomer, thereby tailoring the products. In some embodiments, the fluid mixture entraining the polymer particles and coming from the riser is partially or totally prevented from entering the downcomer, thereby polymerizing different monomer compositions in the riser and the downcomer. In some embodiments, a gaseous or liquid barrier stream is fed through a line placed in the upper portion of the downcomer. In some embodiments, the barrier stream has a composition different from the fluid composition present in the riser. In some embodiments, the flow rate of the barrier stream is adjusted such that an upward flow of gas counter-current to the flow of the polymer particles is generated. In some embodiments, the counter-current is at the top of the downcomer, thereby acting as a barrier to the fluid mixture coming from the riser. In some embodiments, the barrier effect at the top of the downcomer occurs as described in European Patent Application No. EP 1012195 A1.

In some embodiments, the MZCR is placed upstream or downstream of one or more other polymerization reactors based on liquid- or gas-phase technologies, thereby giving rise to a sequential multistage polymerization process. In some embodiments, a fluidized bed reactor is used to prepare a first polymer component, which is successively fed to the gas-phase reactor of The FIGURE to prepare a second polymer component and a third polymer component.

In some embodiments, one or more additional gas phase reactors (GPRs) are downstream of the MZCR which is operating at a temperature at or close to the dew point. In some embodiments, the reactivity ratio of the downstream reactor(s) is increased. It is believed that the catalyst arrives in the downstream reactor more active due to the lower thermal profile of the MZCR. In some embodiments, heterophasic copolymers are produced at higher rates.

In some embodiments, the process is carried out by using olefin polymerization catalysts, alternatively titanium-based Ziegler-Natta-catalysts, Phillips catalysts based on chromium oxide, or single-site catalysts. As used herein, single-site catalysts are catalysts based on chemically uniform transition metal coordination compounds, such as metallocene catalysts. In some embodiments, mixtures of two or more different catalysts are used. In some embodiments, the mixed catalyst systems are designated as hybrid catalysts.

In some embodiments, the process of the present disclosure is carried out in the presence of Ziegler-Natta catalysts made from or containing:
  i. a solid catalyst component made from or containing Mg, Ti, a halogen and an electron donor compound (internal donor),
  ii. an alkylaluminum compound, and
  iii. optionally, an electron-donor compound (external donor).

In some embodiments, component (i) is prepared by contacting a magnesium halide, a titanium compound having at least a Ti-halogen bond, and optionally an electron donor compound. In some embodiments, the magnesium halide is $MgCl_2$ in active form as a support for Ziegler-Natta catalysts. In some embodiments, the titanium compounds are $TiCl_4$, $TiCl_3$, or Ti-haloalcoholates of formula $Ti(OR)_{n-y}X_y$, where n is the valence of titanium, y is a number between 1 and n–1 X is halogen and R is a hydrocarbon radical having from 1 to 10 carbon atoms.

In some embodiments, electron donor compounds for preparing Ziegler type catalysts are selected from the group consisting of alcohols, glycols, esters, ketones, amines, amides, nitriles, alkoxysilanes and aliphatic ethers. In some embodiments, these electron donor compounds are used alone or in mixtures with other electron donor compounds.

In some embodiments, other solid catalyst components used are based on a chromium oxide supported on a refractory oxide, such as silica, and activated by a heat treatment. Catalysts obtainable from those components consist of chromium (VI) trioxide chemically fixed on silica gel. These catalysts are produced under oxidizing conditions by heating the silica gels that have been doped with chromium(III)salts (precursor or precatalyst). During this heat treatment, the chromium(III) oxidizes to chromium(VI), the chromium (VI) is fixed and the silica gel hydroxyl group is eliminated as water.

In some embodiments, other solid catalyst components used are single-site catalysts supported on a carrier, such as metallocene catalysts, made from or containing:
  i. at least a transition metal compound containing at least one n bond; and
  ii. at least a cocatalyst selected from an alumoxane or a compound able to form an alkyl-metallocene cation.

In some embodiments, when the catalyst includes an alkylaluminum compound, such as in Ziegler-Natta catalysts, the molar ratio of solid catalyst component to alkylaluminum compound introduced into the polymerization reactor is in the range from 0.05 to 3, alternatively from 0.1 to 2, alternatively from 0.5 to 1.

In some embodiments, the catalysts are optionally subjected to prepolymerization before being fed to the polymerization reactor. In some embodiments, the prepolymerization occurs in a loop reactor. In some embodiments, the prepolymerization of the catalyst system is carried out at a low temperature, alternatively in a range of from 0° C. to 60° C.

In some embodiments, additives, fillers and pigments are added. In some embodiments, the additional components are selected from the group consisting of nucleating agents, extension oils, mineral fillers, and other organic and inorganic pigments. In some embodiments, the inorganic fillers are selected from the group consisting of talc, calcium carbonate and mineral fillers and affect mechanical properties, such as flexural modulus and HDT. In some embodiments, talc has a nucleating effect.

In some embodiments, the nucleating agents are added in quantities ranging from 0.05 to 2% by weight, alternatively from 0.1 to 1% by weight, with respect to the total weight.

EXAMPLES

The following examples are given to illustrate the present disclosure without any limiting purpose.

Test Methods

Melt Flow Rate (MFR "L")

Determined according to ISO 1133 (230° C., 2.16 Kg)

$^{13}C$ NMR of Propylene/Ethylene Copolymers $^{13}C$ NMR spectra were acquired on a Bruker AV-600 spectrometer equipped with a cryoprobe, operating at 160.91 MHz in the Fourier transform mode at 120° C.

The peak of the S1313 carbon (nomenclature according to "Monomer Sequence Distribution in Ethylene-Propylene Rubber Measured by $^{13}C$ NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, with 15 seconds of delay between pulses and CPD to remove $^{1}H$-$^{13}C$ coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP = 100\, T\beta\beta/S \quad PPE = 100\, T\beta\delta/S \quad EPE = 100\, T\delta\delta/S$$
$$PEP = 100\, S\beta\beta/S \quad PEE = 100\, S\beta\delta/S$$
$$EEE = 100\,(0.25\, S\gamma\delta + 0.5\, S\delta\delta)/S$$
$$S = T\beta\beta + T\beta\delta + T\delta\delta + S\beta\beta + S\beta\delta + 0.25\, S\gamma\delta + 0.5\, S\delta\delta$$

The molar percentage of ethylene content was evaluated using the following equation:

$$E\%\,\text{mol} = 100 * [PEP + PEE + EEE]$$

The weight percentage of ethylene content was evaluated using the following equation:

$$E\%\,\text{wt.} = \frac{100 * E\%\,\text{mol} * MWE}{E\%\,\text{mol} * MWE + P\%\,\text{mol} * MWP}$$

wherein P % mol is the molar percentage of propylene content while MWE and MWP are the molecular weights of ethylene and propylene, respectively.

Xylene-Soluble Fraction (XS)

The xylene-soluble fraction (XS) was measured according to ISO 16152:2005, but with the following deviations:
- the volume of the polymer solution was 250 mL instead of 200 mL;
- the precipitation stage was carried out at 25° C. for 30 minutes, but for the final 10 minutes, the polymer solution was kept under stirring by a magnetic stirrer instead of no stirring at all; and
- the final drying step was done under vacuum at 70° C. instead of 100° C.

The XS is expressed as a weight percentage of the original 2.5 grams of polymer.

Intrinsic Viscosity of Xylene Soluble Fraction (XSIV)

Determined in tetrahydronaphthalene at 135° C.

Examples 1 and 1C (Comparative)

Preparation of the Ziegler-Natta Solid Catalyst Component

The Ziegler-Natta catalyst was prepared according to Example 5, lines 48-55, of the European Patent No. EP728769B1.

Preparation of the Catalyst System—Precontact

Before introducing the solid catalyst component into the polymerization reactors, the solid catalyst component was contacted with aluminum-triethyl (TEAL) and with the dicyclopentyldimethoxysilane (D donor) under the conditions reported in Table 1.

Prepolymerization

The catalyst system was subjected to prepolymerization treatment at 20° C. by maintaining the catalyst system in suspension in liquid propylene for a residence time of 7 minutes before introducing the catalyst system into the polymerization reactor.

Polymerization

The polymerization was carried out in a MZCR, that is, a polymerization reactor including two interconnected polymerization zones, a riser and a downcomer, as described in European Patent No. EP782587. Propylene was polymerized to obtain a crystalline propylene homopolymer. Hydrogen was used as molecular weight regulator. For Example 1C, the MZCR temperature was controlled at a value of 73° C. For Example 1, the MZCR temperature was controlled at a value of 68.5° C., that is, 1.5° C. above the condensation point of the riser gas. The polymer particles exiting from the reactor were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1. Characterization data for the polymers are reported in Table 2.

In Example 1C, no condensate was present in the gas flowing through the riser after contact with the hot recirculating solid flow. For Example 1, a calculated 4% by weight of condensate was entrained in the upper part of the riser together with the solid particles. Nonetheless, both riser and downcomer operations were stable.

The downcomer bottom temperatures stabilized at lower values. When operating at 68.5° C., a higher solid recirculation flow rate was achieved for Example 1 as compared to Example 1C. It is believed that the higher solid recirculation flow rate contributed to a lower overall downcomer temperature. Operating the downcomer with a lower temperature profile improved powder flowability.

Examples 2 and 2C (Comparative)

Preparation of the Ziegler-Natta Solid Catalyst Component—Preparation of the Catalyst System—Precontact—Prepolymerization As in Examples 1 and 1C (comparative).

Polymerization

The polymerization was carried out in a sequence of two gas-phase reactors: a first reactor being a MZCR and a second reactor being a fluidized-bed reactor. In the first reactor propylene was polymerized to obtain a crystalline polypropylene (matrix). The polymer obtained in the first reactor was continuously discharged, separated from the gas into a gas/solid separator, and introduced in the second reactor. In the second reactor, ethylene and propylene were copolymerized to obtain an amorphous rubber. The same product was prepared in the two examples, with the difference being that for Example 2, the MZCR temperature was controlled close to the condensation point of the riser gas (2° C. above). In both reactors, hydrogen was used as molecular weight regulator. The polymer particles exiting from the second reactor were subjected to a steam treatment to remove the unreacted monomers and dried under a nitrogen flow.

A stable MZCR operation was achieved with a calculated 3% by weight of condensate entrained in the upper part of the riser with the solid particles. The downcomer bottom temperature was decreased by as much as 11° C. with no appreciable change in polymer flowability. In the GPR, the reactivity ratio (based on specific mileage) was increased by 65%. To produce the same polymer quantity, the GPR residence time was lowered from 52 to about 28 minutes.

TABLE 1

Process conditions

| Example | | 1 | 1C | 2 | 2C |
|---|---|---|---|---|---|
| PRECONTACT | | | | | |
| Temperature | ° C. | 15.0 | 15.0 | 15.0 | 15.0 |
| Residence time | min | 12.2 | 11.7 | 12.0 | 12.0 |
| TEAL/catalyst | wt/wt | 9.1 | 10.0 | 6.0 | 6.0 |
| TEAL/external donor | g/g | 14.2 | 20.0 | 8.0 | 8.0 |
| PREPOLYMERIZATION | | | | | |
| Temperature | ° C. | 20.0 | 20.0 | 20.0 | 20.0 |
| Residence Time | min | 6.9 | 6.9 | 8.0 | 8.0 |
| POLYMERIZATION - MZCR | | | | | |
| Temperature | ° C. | 68.5 | 73.0 | 65 | 75 |
| Riser gas dew point | ° C. | 67.0 | 67.0 | 63.1 | 63.5 |
| Pressure | bar-g | 28.0 | 28.0 | 30 | 30 |
| Liquid fraction in riser (*) | wt % | 4 | 0 | 3 | 0 |
| Solid velocity | REF = 1 | 1,277 | 1,000 | 1,000 | 1,000 |
| Downcomer bottom inner temperature | ° C. | 80.0 | 86.0 | 79.3 | 86.9 |
| Downcomer bottom skin temperature | ° C. | 86.0 | 92.0 | 78.5 | 89.6 |
| Residence time | min | 62 | 60 | 130 | 131 |
| Production | REF = 1 | 1 | 1 | 1 | 1 |
| Mileage | kg/g | 15 | 11.9 | 33.7 | 33.7 |
| $H_2/C_3-$ riser/downcomer | mol/mol | 0.0007 | 0.0006 | 0.136 | 0.121 |
| POLYMERIZATION - GPR | | | | | |
| Temperature | ° C. | — | — | 80 | 80 |
| Pressure | bar-g | — | — | 18 | 18 |
| Level | % | — | — | 32.2 | 60.0 |
| $H_2/C_2-$ | mol/mol | — | — | 0.039 | 0.034 |
| $C2/(C2 + C3)$ | mol/mol | — | — | 0.45 | 0.43 |
| Residence time | min | — | — | 28.4 | 52 |
| Overall production | REF = 1 | — | — | 1 | 1 |
| Overall mileage | kg/g | — | — | 48.6 | 49.3 |
| GPR production split | % | — | — | 31 | 32 |
| Specific GPR mileage | kg/kg · h · bar | — | — | 1656 | 944 |
| Reactivity ratio (based on specific mileage) | — | — | — | 2.31 | 1.38 |

Notes:
(*) calculated from bottom riser enthalpy balance; $C_2-$ = ethylene; $C_3-$ = propylene; $H_2$ = hydrogen; Split = amount of polymer prepared in the concerned reactor referred to the total weight.

TABLE 2

Polymer characterization

| Example | | 1 | 1C | 2 | 2C |
|---|---|---|---|---|---|
| MFR (230° C./2.16 kg) - homo | g/10' | 1.2 () | 1.27 () | 97 | 100 |
| MFR (230° C./2.16 kg) - final polymer | g/10' | — | — | 16.6 | 17.2 |
| Ethylene units - final polymer | % wt | — | — | 15.3 | 15.5 |
| Ethylene units - rubber | % wt | — | — | 50 | 49 |
| XS - homo | % | 3.1 | 4.4 | 2.5 | 2.1 |
| XS - final polymer | % | — | — | 27.0 | 27.1 |
| XSIV | dl/g | n.m. | n.m. | 3.22 | 3.52 |

Notes:
(**) MFR (230° C./5 kg) - homo; n.m. = not measured

What is claimed is:

1. A process for the polymerization of olefins in gas phase carried out in a reactor having two interconnected polymerization zones, a first zone named the "riser" and a second zone named the "downcomer", wherein growing polymer particles:
   a) flow through the riser under fast fluidization conditions established by feeding a mixture of gas and liquid;
   b) leave the riser and enter the downcomer, through which the growing polymer particles flow downward in a densified form; and
   c) leave the downcomer and are reintroduced into the riser, thereby establishing a circulation of polymer between the riser and the downcomer;
   the reactor is operated at a temperature between 0° C. and 5° C. above the dew point of the riser gas at the operating pressure; and
   in the riser, besides the growing polymer particles and gas flow, an amount of liquid is present.

2. The process according to claim 1, wherein the pressure of operation of the reactor is between 5 and 40 bar-g.

3. The process according to claim 1, wherein the temperature of operation of the reactor is between 40 and 120° C.

4. The process according to claim 1, wherein the two interconnected polymerization zones are operated such that the fluid mixture coming from the riser is totally or partially prevented from entering the downcomer by introducing into the upper part of the downcomer a liquid and/or gas stream, denominated "barrier stream", having a composition different from the fluid mixture present in the riser.

5. The process according to claim 4, wherein one or more feeding lines for the barrier stream are placed in the downcomer close to the upper limit of the volume occupied by the polymer particles flowing downward in a densified form.

6. The process according to claim 3, wherein the barrier stream comprises propane.

7. The process according to claim 6, wherein the barrier steam comprises:
   i. from 10 to 100% by mol of propylene, based upon the total moles in the barrier stream;
   ii. from 0 to 80% by mol of ethylene, based upon the total moles in the barrier stream;
   iii. from 0 to 30% by mol of propane, based upon the total moles in the barrier stream; and
   iv. from 0 to 5% by mol of hydrogen, based upon the total moles in the barrier stream.

8. The process according to claim 7, wherein the composition of the barrier stream derives from condensation or distillation of part of a gaseous stream continuously recycled via a gas recycle line to the reactor having two interconnected polymerization zones.

9. The process according to claim 1, wherein flow rates of antistatic composition are fed into the reactor at the bottom of the riser or into a gas recycle line.

10. The process according to claim 1, wherein the reactor having two interconnected polymerization zones is placed upstream or downstream one or more other polymerization reactors based on liquid- or gas-phase technologies, thereby giving rise to a sequential multistage polymerization process.

11. The process according to claim 1 carried out in the presence of a Ziegler-Natta catalyst comprising:
   i. a solid catalyst component comprising Mg, Ti, a halogen and an electron donor compound denominated "internal donor",
   ii. an alkylaluminum compound, and
   iii. optionally, an electron-donor compound denominated "external donor".

12. The process according to claim 11, wherein the molar ratio of solid catalyst component to alkylaluminum compound introduced into the polymerization reactor is from 0.05 to 3.

* * * * *

UNITED STATES PATENT AND TRADEMARK OFFICE
CERTIFICATE OF CORRECTION

PATENT NO. : 11,098,143 B2  
APPLICATION NO. : 16/649044  
DATED : August 24, 2021  
INVENTOR(S) : Mazzucco et al.

Page 1 of 1

It is certified that error appears in the above-identified patent and that said Letters Patent is hereby corrected as shown below:

On the Title Page

Column 1, Item (30), Line 1, delete "17192309" and insert -- 17192309.7 --, therefor Signed and Sealed this  
Twenty-fourth Day of January, 2023

Katherine Kelly Vidal  
*Director of the United States Patent and Trademark Office*